Sept. 17, 1935. E. MAYER 2,014,945
MASHING APPARATUS
Filed July 13, 1934 3 Sheets-Sheet 1
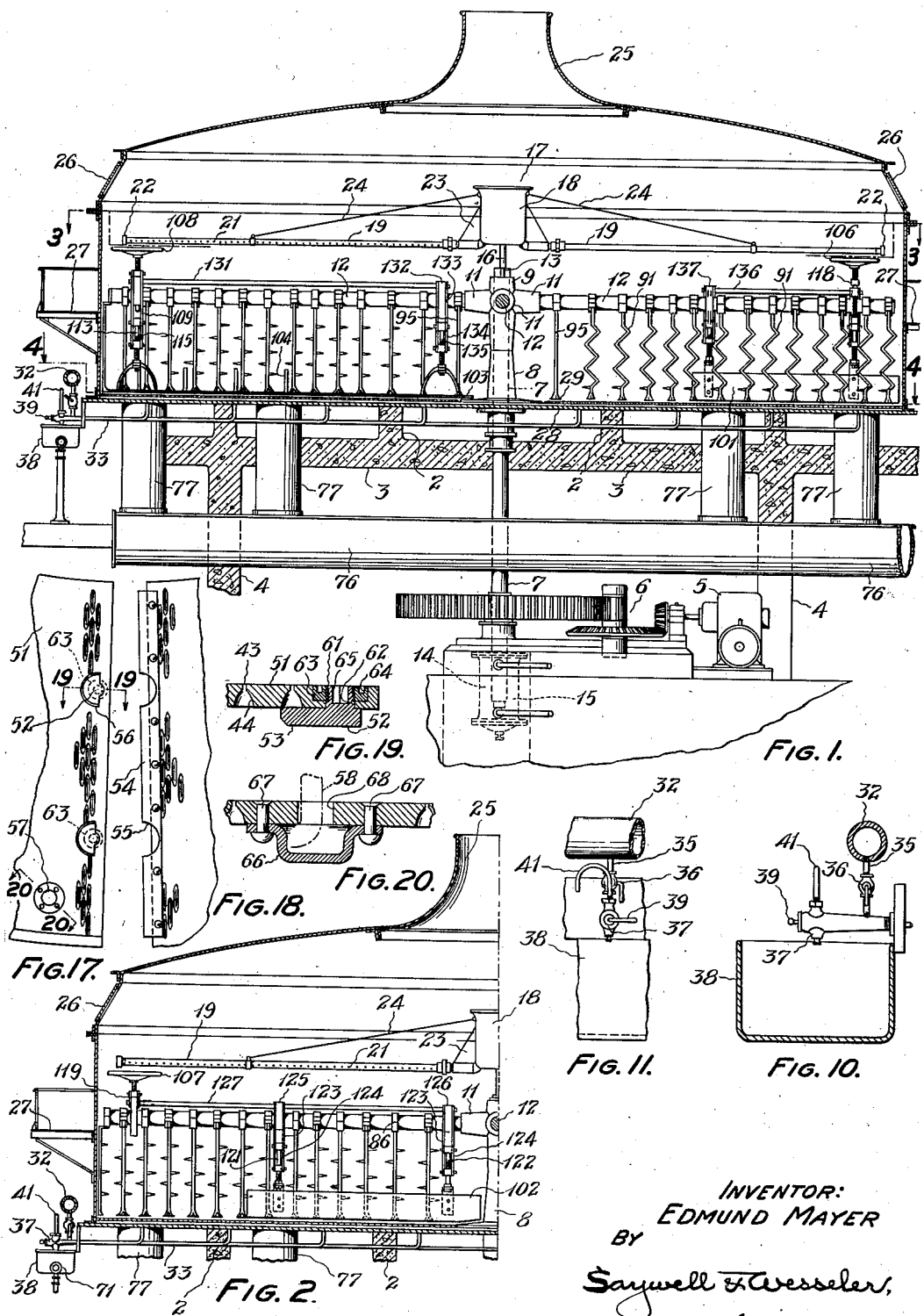
INVENTOR:
EDMUND MAYER
BY
Saywell & Wesseler,
ATTORNEYS Sept. 17, 1935.  E. MAYER  2,014,945
MASHING APPARATUS
Filed July 13, 1934   3 Sheets-Sheet 2

INVENTOR:
EDMUND MAYER
BY
Saywell & Wesseler,
ATTORNEYS

Sept. 17, 1935. E. MAYER 2,014,945
MASHING APPARATUS
Filed July 13, 1934 3 Sheets-Sheet 3
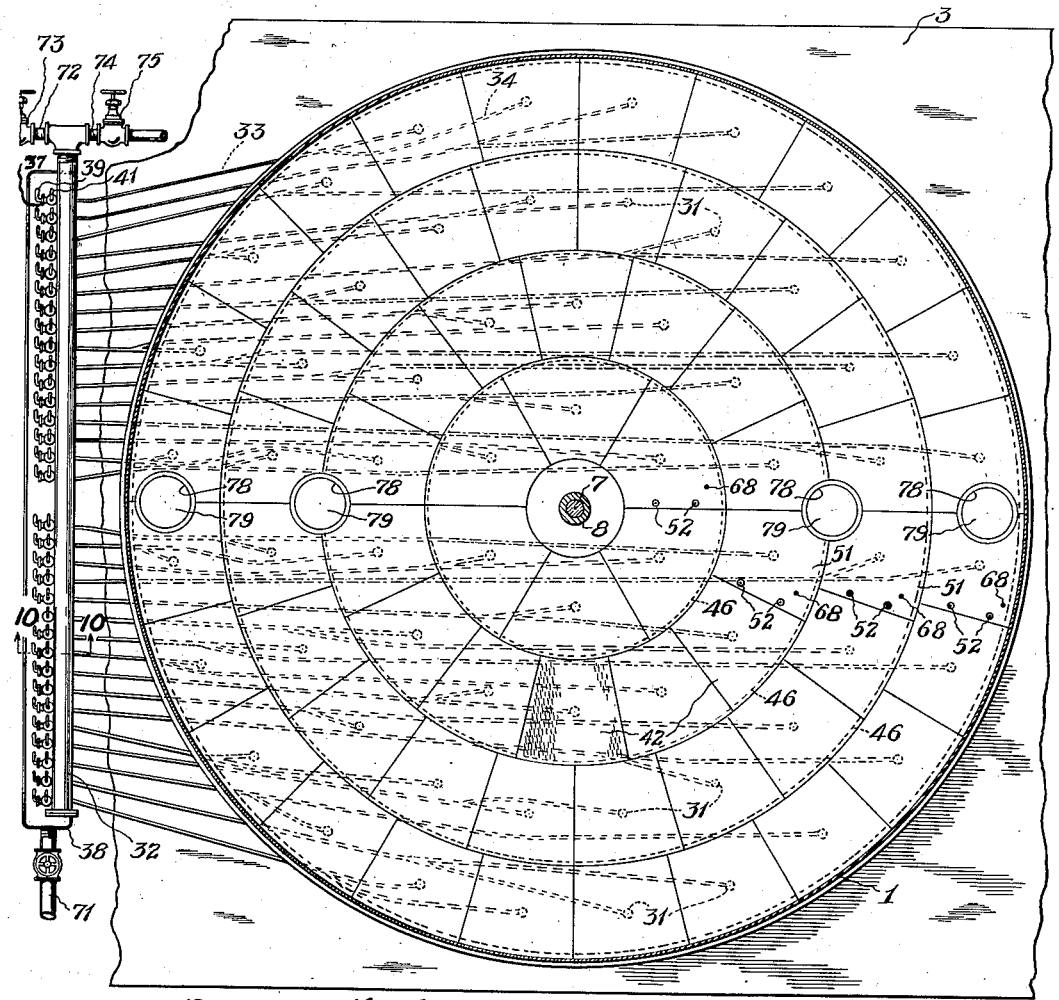
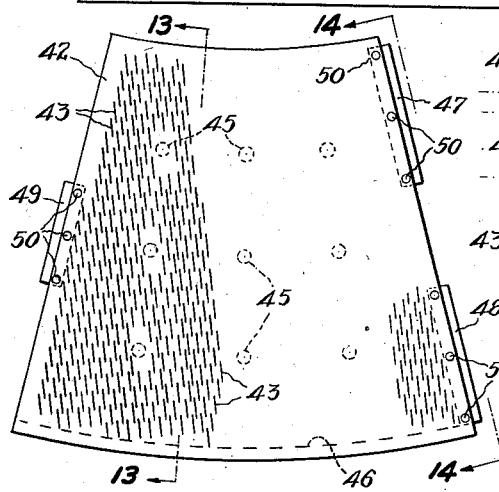
FIG. 12.
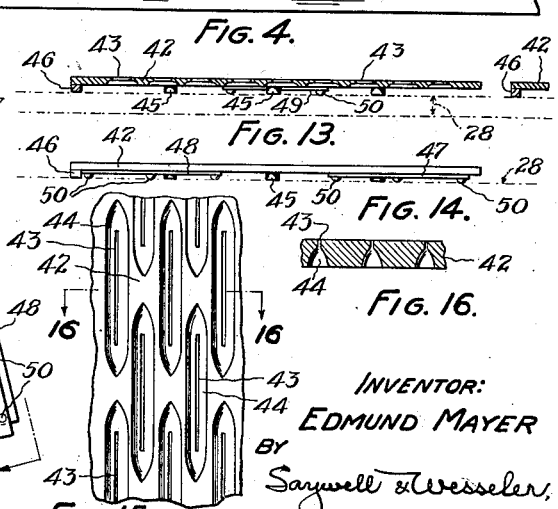
FIG. 4.
FIG. 13.
FIG. 14.
FIG. 16.
FIG. 15.
INVENTOR:
EDMUND MAYER
BY
Saywell & Wesseler,
ATTORNEYS Patented Sept. 17, 1935

2,014,945

UNITED STATES PATENT OFFICE 2,014,945

MASHING APPARATUS

Edmund Mayer, Ulm, Germany

Application July 13, 1934, Serial No. 735,010

17 Claims. (Cl. 195—28)

This invention, as indicated, relates to a method of treating mash, and apparatus relating thereto. More particularly, it comprises the process of so treating crushed or ground grain by infusing and extracting the same as to secure the maximum amount of extract with the shortest period of treatment. It also includes the provision of special equipment to facilitate the uniform and rapid treatment of crushed and ground grain with extraction fluid and with means for agitating and severing the bed of material undergoing treatment.

The invention also has in view the provision of means for stirring, ploughing, cutting and grain-loosening action for the apparatus. It further contemplates the provision of a horizontal cutting knife for application to the mass undergoing treatment and blades for treating or moving the same.

The invention also contemplates draining the grain bed uniformly as to equal areas and in such manner as to prevent formation of drainage channels or separation of the grain layer by pressure head or suction head in the liquid being drawn from the grain bed.

The invention also has in view the arrangement of the means for treating the material in such manner that the subdivision of the bed of material will be carried on successively by different implements. Thus, the plough, sickle, and zigzag knife may follow each other in the order stated, or the plough, zigzag knife and sickle may be arranged to follow one another in accordance with the character of the material to be treated and the various other factors entering into the special work in hand.

Heretofore, apparatus for treating grain has been provided, but such apparatus has not been so arranged as to provide for substantially uniform treatment of every individual portion of the bed of material undergoing treatment. Such apparatus heretofore used has concentrated more stirring action around the material in the central portion of the apparatus than about its margins, and the infusing of liquid with the mass and the removal of extract therefrom has been without control as to the several different portions of the material undergoing treatment.

The principal object of the present invention is to provide a novel method of treating material to be extracted so that the maximum of extract may be obtained within a minimum period of treatment.

Another object of the invention is to provide concentric zones or areas of treatment for a bed of material so that the treatment within each of said areas will be substantially uniform irrespective of the distance of such several areas from the center of the apparatus.

Another object of the invention is to provide an apparatus for treating and withdrawing extract from material to be extracted which will operate with maximum efficiency and minimum period of time and will operate upon widely distributed areas of the material undergoing treatment with substantially uniform effect, irrespective of the position of such areas with reference to the center of the apparatus.

Another object of the invention is to provide an apparatus which will combine within a single machine a variety of cutting and stirring devices so related to each other that their mutual relation to the material undergoing treatment will have the most beneficial effect in producing uniformity of treatment.

Another object of the invention is to provide an apparatus of sturdy construction which will withstand severe usage and which will be adapted within itself to carry out all the necessary steps required for the withdrawing of extract from crushed and treated grains as a step in the process of brewing.

A further object of the invention is to provide an apparatus having a plurality of rotating arms carrying vertical knives and ploughs and horizontal knives with sickles adapted to operate successively upon adjacent portions of a bed of grain undergoing treatment and also to provide a blade adapted to be used as a mashing blade to coact with other elements in separating and distributing the material or to be used as a spent grains blade for clearing the apparatus of the material after it has been finally extracted to the desired extent.

A further object of the invention is to so distribute and proportion the number of drain holes in each of the concentric areas as well as the diameter of such drain holes and the size of the individual false bottom fields or areas for the infusion or extraction of material undergoing treatment as to provide for substantially uniform treatment of the material irrespective of its particular position within the apparatus.

A further object of the invention is to provide apparatus for visible inspection of the draining operation and at the same time lowering the pressure head or suction head.

Other and further objects of the invention will appear in the course of the following description.

The annexed drawings and the following description set forth in detail the means and mode of carrying out the invention, such disclosed means and mode illustrating, however, but several of the different ways in which the principle of the invention may be used.

In said annexed drawings:

Figure 1 is a side elevation, partly in section, taken along the line 1—1, shown in Figure 3, looking in the direction of the arrows, showing one form of apparatus embodying the principles of the invention;

Figure 2 is a fragmentary side elevation, partly in section, taken along the line 2—2, shown in Figure 3, looking in the direction of the arrows;

Figure 4 is a plan view, partly in section, taken along the line 4—4, shown in Figure 1, looking in the direction of the arrows;

Figure 10 is an enlarged vertical sectional view, taken along the line 10—10 shown in Figure 4, looking in the direction of the arrows;

Figure 11 is a fragmentary front elevation showing the valve units illustrated in Figure 10;

Figure 12 is a plan view of one of the plates of the false bottom;

Figure 13 is a sectional view of the false bottom taken along the line 13—13 shown in Figure 12, looking in the direction of the arrows;

Figure 14 is an end view of the structure shown in Figure 12, taken along the line 14—14, looking in the direction of the arrows;

Figure 15 is an enlarged fragmentary view showing a portion of one of the false bottom plates as seen from below;

Figure 16 is a fragmentary sectional view taken along the lines 16—16 shown in Figure 15, looking in the direction of the arrows.

Figures 17 and 18 are fragmentary views of the under sides of the respective terminal plates of a concentric series of false bottom plates showing the locking elements;

Figure 19 is an enlarged sectional detail view, taken along the line 19—19, shown in Figure 17, looking in the direction of the arrows, showing the construction of one of the locking lugs; and Figure 20 is an enlarged sectional detail view, taken along the line 20—20, shown in Figure 17, looking in the direction of the arrows, showing the plate lifting socket.

Figure 3:
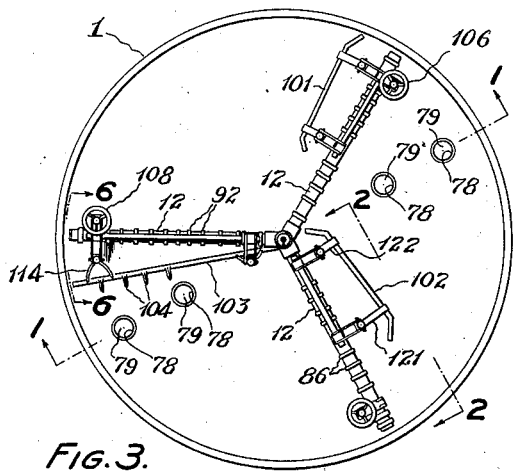
Figure 3 is a top plan view, partly in section, taken along the line 3—3, shown in Figure 1, looking in the direction of the arrows.

As is clearly shown in Figures 1, 2 and 3 of the drawings, the container 1, which comprises the combined mash and drain tub, is in the form of a cylindrical receptacle of greater width than height and positioned vertically upon a substantial support in the form of crossed beams 2, 3, supported on members 4 so as to provide space beneath the apparatus for the driving mechanism shown as in the form of an electric motor 5 and a transmission 6 in the form of a reduction gear mechanism for driving the vertical shaft 7. The drive shaft 7 extends through a hollow hub member or sleeve 8 and has secured to its upper portion a cross-head 9 having a series of sockets 11 within which supporting arms 12 are securely fastened. In place of utilizing a drive beneath the tub, an overhead drive may be provided where considerations of space or like matters require such change.

The cross-head may be secured to the shaft 7 by means of a key 13. The lower end of the shaft 7 is received within a cylinder 14 of a hydraulic lifting mechanism 15 positioned axially beneath the same, whereby vertical adjustment of the plane of operation of the arms and their associated mechanism is readily provided for.

The upper end of the shaft 7 preferably terminates in a point 16 usually termed a "needle", which provides a bearing for the sparging apparatus 17. The sparging apparatus may be of conventional form having a receptacle or reservoir 18 supported on the needle and having a plurality of arms 19 connected with the lower portion of the reservoir and extended radially outward toward the side walls of the mash and drain tub. The arms 19 are in the form of tubes having a series of perforations 21 preferably on one side, the number of such perforations preferably increasing toward the outer ends of said arms so as to provide for a greater distribution of liquid over the outer areas of the grain bed. The tubular arms are provided at their ends with caps 22, and suitable supporting webs 23, and guy wires or rods 24 may be provided to rigidly support the tubular arms. A supply of liquid for the reservoir of the sparging apparatus may be provided by means of a pipe (not shown) which may be supported above the same. The number of tubular arms for the sparging apparatus may be varied as desired, and ordinarily will be equal to the number of arms mounted on the cross-head of the mechanism for subdividing and distributing the grain bed.

The container may have a central vent 25 and is preferably closed at its upper side and is provided with sliding doors 26 which when opened provide ample space for inspection of the contents of the apparatus as well as means for obtaining access to the hand-wheels and associated mechanism carried by said supporting arms, as will be presently described.

In the form illustrated, the apparatus is made of metal and is preferably provided with a belt of insulating material (not shown) around its sides and also preferably has a circular walk 27 affording access to the sliding doors. The container is formed with a bottom, hereinafter referred to as a "true bottom" 28, and a false bottom 29 of shallow depth which is divided into a plurality of independent false bottom fields or areas concentrically arranged about the central hub member extending through such bottom. The particular construction of a preferred type of false bottom will be presently described.

The bottom of the container, as is clearly shown in Figure 4, is provided with drain openings 31 arranged in such relation to each other as to provide draining areas of substantially equal effectiveness over the entire bottom of the container, in order that equal treatment of the grain bed may be carried out and equal extraction of the wort from the grain bed be accomplished. Each of the areas referred to, as shown in Figure 4, is connected with a discharge valve or cock 37 by a pipe line 33, which in the case of large tubs like that illustrated, has a branched pipe 34 whereby each outlet at the discharge cock serves two drain areas and provides a substantially direct line of flow from such drain areas to the discharge cock. The plane in which the drain pipes are positioned is preferably placed closely adjacent the bottom of the container so that no head of liquid will be imposed upon the drain lines or result in displacement or erosion of the grains bed during the draining-off process. Each pipe is connected to the sterilizing manifold through a branch pipe 35, having a valve 36, the branch pipe 35 extending upwardly approximately the distance that the drain pipe 33 connecting with the aperture in the container bottom extends downwardly. In addition to the short connecting pipe 35, leading to the sterilizing manifold, each pipe is provided as heretofore mentioned with a two-way valve 39, having a discharge opening 37 directly downward into the grant 38, and a discharge opening directly upward through a gooseneck pipe 41, and into the grant 38. The gooseneck pipe 41 preferably rises to a point slightly below the sterilizing manifold and terminates slightly below the bottom of the container, so that a gentle gravity flow of liquid from the container may be had by discharging through the goosenecks.

A gooseneck is thus provided for each discharge line or pipe and as the liquid is discharged into the grant, it affords an opportunity for definitely checking the progress of the draining-off operation and ascertaining accurately whether a clear extract is being obtained and discovering whether at any of the drain areas within the container any obstruction to the free flow or drainage of the grain bed is present. This affords a means of maintaining any liquid discharged into the grant of the desired clarity and for stopping at once the introduction of liquid from any portion of the grain bed which is not of satisfactory character.

The sterilizing apparatus comprising the manifold 32 and steam and hot water connections 72, 74, as will be hereinafter described, is provided for the freeing of the tubes or drain pipes as well as the true bottom of any "underdough" which may have accumulated under the false bottom during any portion of the mashing and extraction process. This may be accomplished by admitting hot water or steam into any desired pipe as from connections which will be presently described.

The several drain areas of the container, as is indicated in Figure 4, are covered with segmental plates 42 of the type illustrated in Figures 12 to 20. These plates are preferably formed of sheet metal of suitable composition and are formed with narrow slits 43 extending partially through the same which communicate with enlarged slots 44 formed on the under side of such plates, as is very clearly shown in Figures 15 and 16. The plates are provided on their under side with a series of spaced supporting studs 45 which bear against the bottom of the container, said studs being secured to or formed integrally with the plates and there being no slots or slitted areas at their point of attachment or immediately adjacent thereto. The outer margin of each plate along one of its arc-shaped edges is provided with a strip 46 of the same height as the studs and in cooperation with companion plates in the same concentric area plates forms a separating wall completely around the container. Four such concentric areas are shown in Figure 4, and the strips referred to completely separate each of the concentric draining areas from the adjacent concentric draining areas. Thus any liquid drained into one concentric draining area may flow concentrically within the apparatus, but cannot flow radially. At each radial margin of the plates, interlocking elements are preferably provided. In the form illustrated, flanges are provided projecting outwardly on the under sides of said plates, there being two spaced flanges 47, 48, at one margin and a central single flange 49 at the other margin of a size to fit in the space between the two flanges on a companion plate of the same concentric series of plates. The flanges 47, 48 and 49 are spaced from the bottom by means of feet 50. It will be obvious thus that the plates may be laid in interlocking relation to each other upon the bottom of the container, and will serve to hold each other in position. The last of the series of plates as well as the first of the series of plates, are provided with slightly different engaging elements along one radial margin, as will more clearly appear from Figures 17 and 18. In said figures, one of the plates 51 will be noted to have a pair of semi-circular locking lugs 52, and the other plate 53 to have a flange 54 with semi-circular cut-out areas 55 within which such locking lugs will engage, projecting flanges 56 on said locking lugs serving to engage beneath the plate adjacent the cut-out portions and securely hold the entire concentric row of plates firmly in engagement. A plate-lifting socket 57 is preferably provided in the plate 51 carrying the lifting lugs and a hook member 58 may be engaged therein to lift the plate when the lugs are turned to unlocking position.

The locking lugs 52 may be variously constructed, but, as shown in Figure 19, each lug may have a threaded pivot member 61 engaged in a pivot aperture 62 in the plate 51 and screw-threaded about its upper end and engaged by a screw-threaded collar 63 having holes 64 for a spanner wrench by means of which it can be engaged against its seat, the collar then fitting into the countersunk portion around the pivot aperture and being flush with the upper surface of the plate. A square socket 65 is provided in the upper end of each pivot member so that each lug may be turned to locking or unlocking position by means of a bar wrench having a square end, or by any other suitable implement.

The plate lifting socket 57 is formed by securing a flanged cup 66 to the underside of the plate 51 by means of rivets or pins 67. A hole 68 is provided through the plate centrally of the cup, the hole being of smaller diameter than the cup proper, to provide space within the cup for the end of the lifting hook 58 to engage the under side of the plate 51 as is shown in Figure 20.

The grant 38, as is clearly shown in Figure 4, is connected with a discharge pipe 71 leading to a wort pump whence it may discharge its contents into the kettle or back into the container or mash tub through a special conduit, depending on the quality of the extract and the stage of the mashing or extracting process when the operation is carried on. The sterilizing manifold is connected with a steam line 72 controlled by a suitable valve 73 and is also connected with a hot water line 74 controlled by a similar valve 75, whereby either steam or hot water or a mixture thereof may be admitted to the sterilizing manifold and thence carried into the container to any desired section through any of the pipes which may be placed in communication with the sterilizing manifold by means of the valves 36 and the pipes 35 heretofore described. This operation will serve to clear the particular draining line of underdough.

Beneath the container a discharge passageway or conduit 76 for extracted or spent grains can be provided and vertical spent grain chutes 77 extending upwardly therefrom and communicating with the interior of the container through the openings 78. In the apparatus shown in Figures 1 to 4 inclusive there are four such openings. These openings are closed by plugs or covers 79 as shown in Figure 4 during the mashing operation.

The apparatus for subdividing and handling the grain bed and forming planes of separation therein to permit thorough infusion of the liquid with the grain and substantially uniform extraction within a minimum of time, will now be described.

As has been heretofore explained the number of supporting arms 12 on the cross head 9 may be varied as desired and the number of tubular arms 19 on the sparging apparatus may be similarly varied, each of the supporting arms is designed to carry operative elements of predetermined character such as ploughs, zigzag knives, spent grains blades, or mash blades, horizontal knives with or without sickles, straight blades or various combinations or variations of these elements. The ploughs are preferably in the form of straight vertical shanks 81, but may have their upper portions bent forwardly or rearwardly, the latter being shown as the blades 82 in Figure 6 of the drawings. The shanks of the ploughs have sharp front edges 83 as is shown in Figure 7 and outwardly flared triangular foot sections 84 tapered upwardly and presenting an upwardly beveled forward portion and may be hollow at their rearward portions. The shanks of the ploughs are preferably provided with short side knives 85 in staggered relation on opposite sides. The forward or cutting portions of these knives may be tapered rearwardly toward their free ends, presenting a diagonal cutting edge. The shank portions of the ploughs are preferably secured to the cylindrical supporting arms by means of split clamping rings 86, and alternate plough members are preferably secured to the supporting arms in the vertical planes of the forward and rearward portions of said supporting arms.

Figure 9:
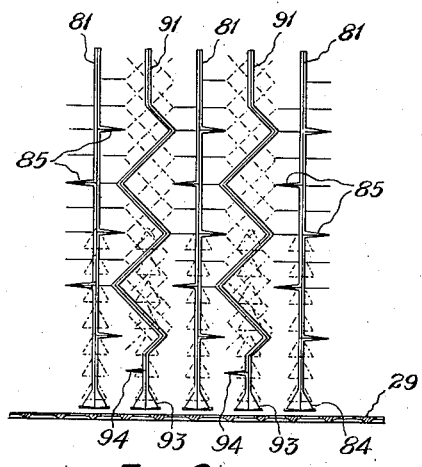
Figure 9 is a schematic diagram showing the cutting action which takes place under different vertical adjustments of the mechanism.

Zigzag knives 91 are similarly attached to the forward and rearward portions of the designated supporting arms 12 by means of split clamping rings 92. The zigzag knives are preferably provided with triangular foot sections 93 similar to the foot sections of the ploughs and may have one or more short side knives 94, preferably a single such knife adjacent the foot section as shown in Figure 9.

In addition to the ploughs and zigzag knives one or more straight knives 95 may be provided on one or more of the supporting arms 12, preferably immediately adjacent the shaft. Such straight knives preferably have no triangular foot portions and terminate in spaced relation to the bottom.

Figure 8:
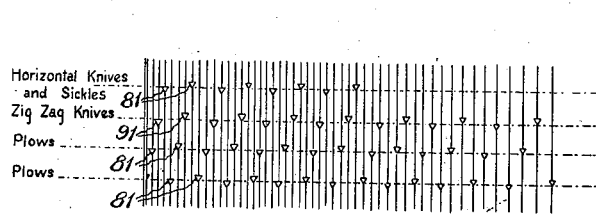
Figure 8 is a schematic projection showing the positioning and successive action of the severing and subdividing elements for the grain bed.

The ploughs and zigzag knives are preferably arranged in progressively closer relation to each other toward the free ends of the supporting arms, as is shown in Figures 1, 2 and 3, and also schematically as shown in Figure 8. The purpose of such closer spacing at the outer ends of the arms is to provide for equal effectiveness of the subdividing elements upon the grain bed remote from the center, as is had by the more widely spaced elements near the center. Where such subdividing elements traverse a circular path, it is obvious that areas of the grain bed nearer the center will receive relatively more effective subdividing and infusing action than equal areas near the outer portions of the container, and that to compensate for this unequal travel, the subdividing elements will have to be proportionately more numerous adjacent the outer portion of the grain bed. Similarly, the number of draining areas and draining conduits should be relatively more numerous adjacent the outer portion of the container to secure substantially equally effective extraction over equal areas throughout the grain bed.

In addition to the subdividing elements attached directly to the supporting arms 12, it is usually desirable to provide one or more spent grains and mash blades 101, 102, on the apparatus, and usually one horizontal knife 103, as is shown in Figures 1, 2 and 3. Such horizontal knives may have short vertical upstanding knives which are designated "sickles" 104, or they may be provided without sickles according to the size of the mash tub, the height of the grain bed, the number of arms, the speed of revolution, and various other considerations.

Figure 6:
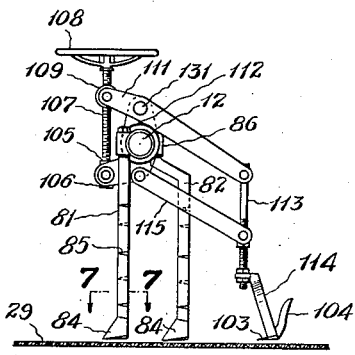
Figure 6 is a side elevation in enlarged detail, taken along the line 6—6, shown in Figure 3, looking in the direction of the arrows, showing the horizontal knife adjusting means.
Figure 7:
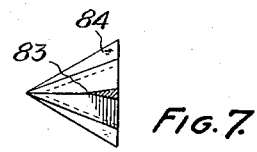
Figure 7 is an enlarged detail view, partly in section, taken along the line 7—7, shown in Figure 6, looking in the direction of the arrows, and showing one of the plough points.

The method of supporting the horizontal knives with sickles is shown in Figure 6, wherein a bracket 105 is secured to the supporting arm 12 having a fixed sleeve bearing 106 for a screw shaft 107 operated by a handwheel 108. An internally screw-threaded collar 109 is pivotally carried on the end of a lever 111 pivotally supported at an intermediate point on a bracket 112 and at its opposite end is pivotally engaged with a supporting bar 113 having a screw-threaded section to which is adjustably attached a bracket 114 of the horizontal knife 103. A link 115 is preferably pivoted on the bracket 105 at one end and to the lower portion of the supporting bar 113, which with the lever 111 provides for positioning the knife horizontally at various levels of adjustment. The sickles 104 may be of various forms, but preferably are of the shape shown in Figure 6.

Figure 5:
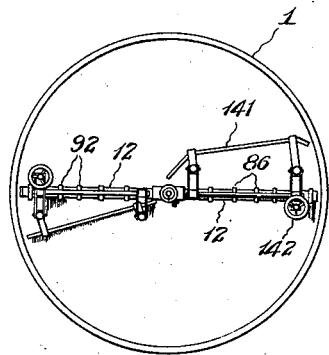
Figure 5 is a plan view, partly in section, on a reduced scale, similar to Figure 3, showing an apparatus having two supporting arms.

The spent grains or mash blades 101, 102, are preferably supported on similar mechanism having handwheels 106, and 107, respectively, operating similar adjusting mechanisms 118, 119. It should be noted that the handwheels are always positioned adjacent the free ends of the supporting arms, even though in the case of the inwardly positioned spent grains or mash blade 102, its points of support are positioned inwardly of the position of the handwheel and its associated lever. In such instance the blade itself is carried on vertical supporting bars 121, 122, pivotally connected with upper links 123 and lower links 124 pivotally mounted on brackets 125, 126, respectively, clamped upon the supporting arm. The pivot member for the lever comprises a bar 127 in fixed relation to said lever and extending parallel to the supporting arm and such bar is fixedly engaged with the upper of such link members 123 in each instance. The bar is pivotally supported at intervals adjacent such point of connection with the links by the brackets 125, 126, so that any adjustment of the lever by means of the handwheel mechanism is carried to the link mechanism in equal degree. It is also to be noted that a bar similar to the bar 127 is used even where the lever 111 has an extension which supports the spent grains or mash blades or the horizontal knife. In such instance, as shown in Figure 1, the pivot member for the lever is associated with the bar 131 which is fixedly engaged with said lever and extends parallel to the supporting arm to the inner bracket member 132 in which it is pivotally mounted. The upper members 133 of a pair of parallel links having lower members 134 are fixedly engaged upon the bar 131, the free ends being pivotally engaged with the vertical supporting bar 135 connected with the horizontal knife at its inner end, to thus provide for positive lifting of the inner end of the knife uniformly with the outer end thereof. A similar arrangement is provided for lifting the spent grains or mash blade 101 through having a bar 136 associated with an inner blade supporting mechanism 137 similar to the mechanism at the inner end of the horizontal knife just described.

Where a two-arm machine is provided, as is shown in Figure 5, the construction is substantially similar to that shown and described in connection with Figure 3. In such case, however, in place of using a pair of spent grains blades of relatively shorter length and slightly overlapping in their paths of travel, as in the construction shown in Figure 3, a single spent grains blade 141 is provided, said blade being adapted to extend completely across the false bottom and having its ends angularly disposed so as to carry the extracted grain toward the discharge chutes of the apparatus. The position of the spent grains blade 141 is controlled by a handwheel 142 and associated mechanism similar to that heretofore described in connection with the spent grains and mashing blades and the horizontal knife shown in Figure 3.

The apparatus shown in Figures 1, 2 and 3, particularly, is provided with three arms, but the number of arms provided for in any particular machine depends in a considerable extent upon the size of the apparatus. With a machine having only two arms, the outer subdividing knives and ploughs must be placed so closely together that the grain bed is liable to be bodily displaced. For this reason, it is preferable to use three arms, including a horizontal cutting knife which acts upon the grain bed upon any preferred level of subdivision, and which upon its outer portion carries as many sickles as would be required to properly subdivide equal portions along vertical divisions. With a machine having three arms, if desired, a number of sickles may be used, but usually it will be found that the operation can be carried on so well with the other subdividing elements that no sickles at all are required. Likewise, where a four-arm machine is provided, in most instances it will be unnecessary to have sickles upon the horizontal knife, the subdivision being accomplished by means of ploughs and zigzag knives. The grain, when it is compacted on the double bottom, can be cut away from such bottom by means of the horizontal knife, and the ploughs and zigzag knives can again engage the same and subdivide the same. With the horizontal knives, the grain bed can be subdivided in every horizontal level, and with the zigzag knives and ploughs the grain bed can be divided vertically. The apparatus thus provides for the proportionate functioning of the subdividing apparatus together with the proportionate functioning of the sparging apparatus and the proportionate functioning of the double bottom, so that uniformity of treatment is carried through in all instances, irrespective of whether any particular area of the grain bed is adjacent the central portion of the apparatus or is adjacent the outwardly disposed areas of the apparatus.

When the apparatus is of smaller size and a heavier or higher grain bed is to be used in such apparatus, it is frequently necessary to provide special forms of ploughs and knives to suitably subdivide the grain bed.

It will be noted by reference to Figure 8, that the grain bed is divided vertically by means of a double series of ploughs on two successive supporting arms followed by zigzag knives carried on the third supporting arm which also carries on suitable links and brackets a horizontal knife with vertically upstanding sickles, such sickles being disposed only over the outer half portion of such horizontal knife. It will be noted that the ploughs and zigzag knives are more closely positioned adjacent the outer end of the supporting arms, and also that such subdividing elements alternate on opposite sides of the arm in the direction of motion of the supporting arm therefor. The extreme outer portion of the grain bed will be first subdivided by one of the ploughs on the first supporting arm, and after it has passed through the grain bed, a plough on the second supporting arm will form a line of subdivision closely adjacent the path of travel of the first plough, and thereafter a zigzag knife on the third supporting arm will in its turn form a line of subdivision closely adjacent the path of travel of the plough on the second supporting arm, and thereafter the outermost sickle on the horizontal knife will form a line of subdivision inwardly of the outermost zigzag blade and yet outwardly of the second plough on the first supporting arm. This method of subdividing the grain bed in the stages just described will take place completely across the bottom of the apparatus and will be repeated for each complete revolution of the supporting arms and their subdividing elements.

In Figure 9 there is shown the different horizontal levels at which the subdividing elements may be adjusted to operate. The horizontal knife may be independently adjusted to operate at any desired level and likewise the spent grains blade when used as a mashing blade may be adjusted to any desired horizontal level. As has been explained, the ploughs carry short horizontal knives alternating in staggered relation on the respective sides and the zigzag knives may likewise carry one or more such short horizontal knives. The diagram shown in Figure 8 is merely illustrative and is not intended to set forth an essential arrangement of the ploughs and zigzag knives and sickles, nor to restrict the apparatus to the combination of these various elements, inasmuch as for certain purposes special elements may be required or a larger number of some of these elements and none of the others. Therefore, the proportion of each of the subdividing elements or their arrangement is a matter to be adjusted in accordance with the work in hand to secure the best results, varying with the character of the material to be handled, the size of the apparatus, the speed of rotation, the height of the grain bed, and various other conditions connected with such work.

The apparatus above described is adapted for use in connection with any of the standard practices used in connection with the production of malt liquors and also is adapted for use with certain special operations and processes as may be in use in certain plants as individual practices, and it is not intended to limit the use of the apparatus in any way for any purpose for which it may be found useful. It will be found, however, that through the use of the apparatus along the lines which have been explained, a most highly efficient method of extracting the maximum amount of wort in a minimum amount of time consistent with a high quality product is provided for. In this way the invention includes the method of extracting wort from grains which comprises the steps of spreading the grains bed over a circular area, and supplying liquid to such grains bed, and forming successive subdivisions in the grains bed along circular paths, with the number of such subdivisions increasing progressively from the center of such circular area to permit thorough and substantially equal access of moisture to all parts of the grains bed, and draining the extract from the grains bed over substantially equal areas of the grains bed along a plurality of individual lines each having a small pressure head.

Other forms may be employed embodying the features of the invention instead of those here explained, change being made in the means and mode so long as the elements stated by any of the following claims or the equivalent of such stated elements be employed.

I therefore particularly point out and distinctly claim as my invention:

1. A mash tub having in combination a closed cylindrical container having a double bottom divided into independent concentric compartments, a plurality of perforated areas provided in the upper wall of said double bottom, and a plurality of individual means communicating with equal individual areas of the concentric compartments for admitting fluid to and withdrawing fluid from said container through said respective independent compartments.

2. A mash tub having in combination a closed cylindrical container having a double bottom divided into independent concentric compartments, a plurality of perforated areas disposed in spaced radial and concentric relation in said double bottom, and a plurality of individual means communicating with equal individual areas of the concentric compartments for admitting fluid to and withdrawing fluid from said container through said respective independent compartments.

3. An apparatus of the character described, having in combination a vertically positioned cylindrical container having a double bottom divided into independent concentric compartments, means associated with said double bottom for admitting fluid to and withdrawing fluid from said container through said respective independent compartments, a support disposed axially of said container, radial arms supported for movement pivotally about said support, vertical cutting elements supported on certain of said radial arms, and horizontal cutting elements and horizontal mash blades supported on other of said radial arms.

4. An apparatus of the character described, having in combination a vertically positioned cylindrical container having a double bottom divided into independent concentric compartments, means associated with said double bottom for admitting fluid to and withdrawing fluid from said container through said respective independent compartments, a support disposed axially of said container, radial arms supported for pivotal movement around said support, vertical cutting elements supported on certain of said radial arms and positioned to travel along more closely positioned paths of movement adjacent the outer portions of said arms, horizontal cutting elements and horizontal mash blades supported on other of said radial arms, adjustable supporting means for said mash blades, and means for controlling the position of said supporting means.

5. An apparatus of the character described, having in combination a cylindrical container, a true bottom for said container having a series of drain holes, a perforated false bottom for said container in the form of segmental plates adapted to be positioned above said true bottom, means on said plates for spacing said false bottom from said true bottom, and for subdividing concentrically the space between said false bottom and said true bottom forming a plurality of independent draining areas.

6. An apparatus of the character described, having in combination a cylindrical container, a true bottom for said container having a series of drain holes, a perforated false bottom for said container adapted to be positioned above said true bottom, means for spacing said false bottom from said true bottom, and means for subdividing concentrically the space between said false bottom and said true bottom forming a plurality of independent concentric draining areas.

7. An apparatus of the character described, having in combination a cylindrical container, a true bottom for said container having a series of drain holes, a perforated false bottom for said container formed of a series of segmental plates adapted to be positioned over said true bottom, means for spacing each of said false bottom plates from said true bottom, and a strip forming a wall member along at least one edge of each plate coacting with like members on adjacent plates of the series to subdivide the space between the true and false bottoms into concentric independent series of channelways.

8. An apparatus of the character described, having in combination a cylindrical container, a true bottom for said container having a series of drain holes, a perforated false bottom for said container formed of a series of segmental plates adapted to be positioned over said true bottom, means for spacing each of said false bottom plates from said true bottom, and a strip forming a wall member along at least one arcuate edge of each plate coacting with like members on adjacent plates of the series to subdivide the space between the true and false bottoms into concentric independent series of channelways extending completely around the bottom of said container.

9. An apparatus of the character described, having in combination a cylindrical container, a true bottom for said container having a series of drain holes, a perforated false bottom for said container formed of a plurality of series of concentrically positioned segmental plates adapted to be positioned over said true bottom, supporting members at spaced intervals on the under side of each false bottom plate to space the same from the true bottom, projecting interlocking members at each radial margin of each segmental plate to interengage with complementary members on companion plates of each respective concentric series, projecting feet on said interlocking members to support and space said plate from the bottom, and a strip forming a wall member along at least one arcuate edge of each of said plates coacting with like members on adjacent plates of the series to subdivide the space between the true and false bottoms into concentric independent series of channelways.

10. An apparatus of the character described, having in combination a cylindrical container, a true bottom for said container having a series of drain holes, a perforated false bottom for said container formed of a plurality of series of concentrically positioned segmental plates adapted to be positioned over said true bottom, supporting members at spaced intervals on the under side of each false bottom plate to space the same from the true bottom projecting interlocking members at each radial margin of each segmental plate to interengage with complementary members on companion plates of each respective concentric series, projecting feet on said interlocking members to support and space said plate from the bottom, and a strip forming a wall member along one arcuate edge of each plate coacting with like members on adjacent plates of each respective series, to subdivide the space between the true and false bottoms into a plurality of independent concentric channelways extending completely around the bottom of said container.

11. An apparatus of the character described, having in combination a cylindrical container, a true bottom having drain holes, a perforated series of segmental plates adapted to be positioned in spaced relation to said true bottom to form a false bottom, a strip forming a wall member along one arcuate edge of each plate coacting with like members on adjacent plates of each respective series to subdivide the space between the true and false bottoms into a plurality of independent concentric channelways extending completely around the bottom of said container, cooperating interlocking elements carried on two opposite marginal edges of said segmental plates whereby said plates may be laid over said true bottom in interengaging relation, and means on each terminal plate of a series of segmental plates for locking said series of plates against displacement without interfering with the free flow of liquid in each of such concentric channelways.

12. An apparatus of the character described, having in combination a container for grain to be extracted, means for supplying liquid to a grain bed within said container, means traveling about an arcuate path within said container for subdividing said grain bed without bodily displacing the same to admit liquid to all portions thereof, said subdividing means being more densely concentrated over the outer areas of said arcuate path of movement wherein greater distances are traversed and more bulk of grain subdivided than adjacent the central portions of said container.

13. An apparatus of the character described, having in combination a container provided with a true bottom and a perforated false bottom in spaced relation thereto, draining passageways connected with drain holes disposed in said true bottom to drain substantially equal areas thereof, segmental plates provided with subdividing flanges along at least one edge forming said false bottom and being positioned over said respective drain holes and forming extended individual concentric channelways in cooperation with companion plates, a fluid control device for each of said series of draining passageways providing valves to withdraw fluid from such passageways or to discharge fluid into such passageways.

14. An apparatus of the character described, having in combination a cylindrical container, a true bottom and false bottom for said container, a plurality of drain conduits connected with independent concentric spaced areas beneath said false bottom, said conduits being positioned in a plane slightly below the bottom of said container and having short upwardly turned sections communicating with said bottom at one end and having upwardly turned gooseneck discharge members at the free ends rising to a plane slightly below the minimum liquid level at the bottom of said container and providing a very slight pressure differential for the draining of said respective container areas through said goosenecks.

15. An apparatus of the character described, having in combination a cylindrical container, a true bottom and false bottom in spaced relation for said container, means subdividing the space between said true and false bottom members into independent concentric draining areas, a plurality of drain conduits connected with each of the respective concentric draining areas beneath said false bottom, said conduits being positioned in a plane slightly below the bottom of said container and having short upwardly turned sections communicating with said bottom at one end and having upwardly turned gooseneck discharge members at the free ends rising to a plane slightly below the minimum liquid level at the bottom of said container and providing a very slight pressure differential for the draining of said respective container areas through said goosenecks.

16. An apparatus of the character described, having in combination a cylindrical container, a true bottom and false bottom in spaced relation for said container, means subdividing the space between said true and false bottom members into independent concentric draining areas, a plurality of drain conduits connected with each of the respective concentric draining areas beneath said false bottom, said conduits being more numerous in each concentric draining area progressively in a direction outwardly from the center of the apparatus, to effect substantially equal liquid extraction from material within said container over substantially equal surface areas within each concentric area.

17. An apparatus of the character described, having in combination a container provided with a true bottom and false bottom, a fluid control device, including a grant, positioned adjacent said container in approximately the plane of the bottom thereof, a plurality of drain conduits extending from said fluid control device to draining apertures communicating with independent concentric areas beneath the false bottom of said container in a plane closely adjacent the bottom of said container with a minimum amount of vertical extent, and valve elements tapped into the said drain conduits adjacent the free ends of each of said drain conduits providing for independent connection with a source of steam and a source of hot water for injecting the same back through the draining apertures into the container.

EDMUND MAYER.